United States Patent [19]
Taniguchi et al.

[11] Patent Number: 6,137,197
[45] Date of Patent: Oct. 24, 2000

[54] AXIAL FLOW FAN MOTOR WITH CIRCUIT BOARD AND HOUSING INTERLOCKING STRUCTURE

[75] Inventors: Noboru Taniguchi; Shuichi Otsuka, both of Miyota-machi, Japan

[73] Assignee: Minebea Co., Ltd., Miyota-machi, Japan

[21] Appl. No.: 09/291,193

[22] Filed: Apr. 14, 1999

[30] Foreign Application Priority Data

Jan. 12, 1999 [JP] Japan ................... 11-005255

[51] Int. Cl.⁷ ............................................. H02K 7/14
[52] U.S. Cl. ............................. 310/67 R; 310/89; 310/91
[58] Field of Search ................. 310/67 R, 68 B, 310/89, 91; 29/596, 597, 598

[56] References Cited

U.S. PATENT DOCUMENTS

| | | | |
|---|---|---|---|
| 4,309,815 | 1/1982 | Schmitt et al. | 29/596 |
| 4,934,041 | 6/1990 | Hoover et al. | 29/596 |
| 5,550,414 | 8/1996 | Sakashita et al. | 310/67 R |
| 5,739,615 | 4/1998 | McClelland | 310/186 |
| 5,877,578 | 3/1999 | Mitcham et al. | 310/268 |

*Primary Examiner*—Nestor Ramirez
*Assistant Examiner*—Tran Nguyen
*Attorney, Agent, or Firm*—Oliff & Berridge, PLC

[57] ABSTRACT

An axial flow fan motor is provided with a motor housing that supports a bearing box. Bearings supported by the bearing box rotatably support a rotary shaft on which a yoke and an impeller are fixed. A U-letter shaped groove is provided on one portion of the motor housing, which is adapted to be engaged with a projection provided on an outer circumference on a PC board assembled with a control circuit. Since the PC board is securely positioned, the tip end of a probe of an automatic test machine can securely contact the terminal pin.

2 Claims, 4 Drawing Sheets

AXIAL FLOW FAN MOTOR WITH CIRCUIT BOARD AND HOUSING INTERLOCKING STRUCTURE

BACKGROUND OF THE INVENTION

1. Field of the Invention

The present invention relates to an axial flow fan motor for use of every OA (office automation) appliance.

2. Conventional Art

Since most OA appliances comprise various electronic circuits within their housings, the heat generated from those circuits is difficult to release from those circuits, so that one portion of the electronic parts of those circuits are threatened to be broken or deteriorated. In particular, in the recent tendency of miniaturization of OA appliances, although the heat amount due to the heat generation is not reduced, on the other hand the OA appliances are miniaturised, which invites a counter measure for the heat as a technically important problem to be solved.

Now, a conventional axial flow fan motor which is used for discharging the heat of appliances is explained based on FIG. 5. A rotary shaft 2 is provided at a center portion of a casing 1 while being supported rotatably with a pair of bearings 3 and 4 are fit in a bearing box 5 made of a metal, which is inserted in a motor housing 6, which is a part of the casing 1 and fixed. In most of the conventional axial flow fan motors, in order to produce it at a lower cost, the casing 1 and the bearing box 5 are molded with a resin in a unitary manner.

Around the outer circumference of the bearing box 5 a stator 9 consisting of a stator iron core 7 and a stator winding 8. This stator 9 has, as shown in FIG. 8, a recessed portion 7a on an inner diameter wall of the stator iron core 7 and this recessed portion 7a is coupled with a projection provided on the outer circumference of the bearing box 5 to be positioned and fixed with a glue.

On the motor housing 6, an annular PC board (printed circuit substrate) 10 is supported by the control current from an electronic circuit. This PC board 10 is provided with electronic circuits, terminals for the stator winding 8 and other electronic parts are mounted thereon. In addition, the PC board 10 is connected with a cord 11 which is led to an outer electric source.

On the upper end of the rotary shaft 2, a boss 12 made of a zinc casting is mounted, and between the boss 12 and the bearing 3 of the top end a coil spring 13 is interposed to give a pressure to an inner ring for securing the positions of the boss 12 and the bearing 3. Further, at the portion where the rotary shaft 2 cones in contact with the bearing 4 a retainer ring 14 is coupled to prevent the rotary shaft 2 from removing. A central portion of a U-letter shaped yoke 15 is mounted to the boss 12.

To the inner wall of the yoke 15 a ring-like magnet 16 is mounted by gluing and facing to the stator iron core 7 of the stator 9 at a predetermined spacing. On the outer circumference of the yoke 15 an impeller 18 molded with wings 17 is fixed by being pressed-in in a unitary manner.

FIG. 6 shows a side of the stator 9, and FIG. 7 shows a state where the PC board 10 is mounted on the stator 9. Further, FIG. 8 is a plan view of the PC board 10. The stator 9 consists of, as explained before, the stator iron core 7 is provided with a bobbin 19 and the stator winding 8 is formed by being wound around the bobbin 19. The terminal of the winding is connected to a terminal pin 20. As shown in FIG. 6, the stator 9 is attached tight to the PC board 10, and fixed by soldering 21. The stator 9 is connected electrically and mechanically.

As shown in FIG. 8, the PC board 10 is provided with holes 10a for receiving a stator winding terminal, in which the terminal pin 20 is inserted and soldered 21 (see FIG. 7). Three of holes 10 are disposed triangularly, and a hole 10b for the stator iron core 7 is provided at the center of the PC board in such a manner as it is surrounded by the three holes 10a.

This hole 10b is circular in shape and capable of being penetrated by the stator iron core 7. As shown in FIG. 8, the stator iron core 7 comes through the PC board 10. A recessed portion 7a is provided on the stator iron core 7, into which a projection (not shown) formed on the bearing box 5 is coupled to position the stator iron core 7. In FIG. 8, 10c are terminals to be connected with the leads, which after assembling the motor, are used in such a manner as to allow a probe(not shown) of an automatic test machine to be inserted through a cutout 22 of the motor housing 1 and contacted to investigate the function.

In the thus structured axial flow fan motor, a current controlled by electronic circuits assembled on the PC board 10 is input in the stator winding 8, thereby the stator iron core 7 is generated electro-magnetically and a magnetic interference between the stator iron core 7 and a magnet 16 makes the rotary shaft rotate together with the yoke 15 and the impeller 18. Since the impeller has wings 17, a certain directional air flow is generated in the motor housing 1.

Since the functional check after assembling the motor is carried out by inserting the probe of the automatic test machine through the cut out portion 22 of the motor housing 1 and contacting the terminal pin 20 of the PC board 10, if the PC board is not positioned correctly, the test can not be carried out. According to the conventional technique mentioned above, the positioning of the stator 9 is carried out by coupling the recessed portion 7a of the stator iron core 7 with the projection of the bearing box 5, thereby, the positioning of a plurality of terminal pins 20 provided on the bobbin 19 of the stator 9 has been determined in a circumferential direction.

In the above conventional positioning method, there is no problem in the insertion of the terminal pins 20, but, on the other hand, even by paying attention to the precise coupling of the recessed portion of the inner diameter portion of the stator iron core 7 to the projection of the bearing box 5 in order to lessen the replacing amount as small as possible, in the area of the outer diameter portion of the PC board 10, the circumferential displacement thereof becomes great and the probe of the automatic test machine may not touch properly with the terminals 10c to be connected with the leads after the axial flow fan motor is assembled. In a spacing of the terminal 10c which is used in a general axial flow fan motor, a circumferential displacement in the outer diameter portion is at greatest less than 0.6 mm, preferably less than 0.4 mm.

SUMMARY OF THE INVENTION

The present invention, has been made in the light of the above problem, and the object thereof is to provide an axial flow fan motor in which the PC board thereof is not displaced in its circumferential direction in the area of the outer diameter portion.

In order to solve the above problem, the first aspect of the present invention is characterized in that, in an axial flow fan motor, in which a motor housing supports a bearing box, a rotary shaft is supported rotatably by the bearings supported by the bearing box, a yoke is fixed on the rotary shaft, an impeller having wings is fixed on the outer diameter portion of the yoke, a magnet is mounted on the inner diameter portion of the yoke, facing to the magnet a stator winding is positioned at a space and a PC board assembled with electronic circuits for supplying a current to the winding for rotating the rotary shaft, a U-letter like groove is provided on a portion of the motor housing and with which a projection provided on the outer circumference of the PC board is engaged.

And, according to the second aspect of the present invention, in what is recited in the first aspect, the width difference between the groove and the projection of the PC board to engage with the groove is arranged to be less than 0.6 mm.

Whereby, when assembling the motor, the projection provided on the PC board can be engaged with the groove formed on a portion of the motor housing.

DETAILED DESCRIPTION OF A PREFERRED EMBODIMENT

Figure 1:
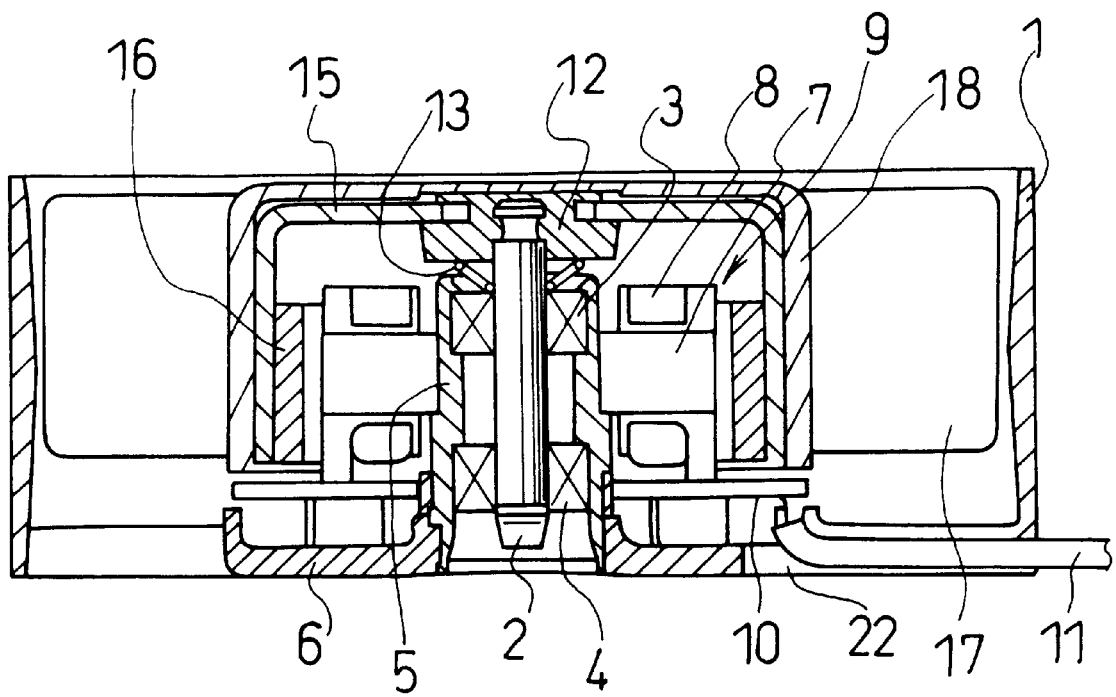
FIG. 1 is a vertically sectional view of one embodiment of the axial flow fan motor of the present invention.
Figure 2:
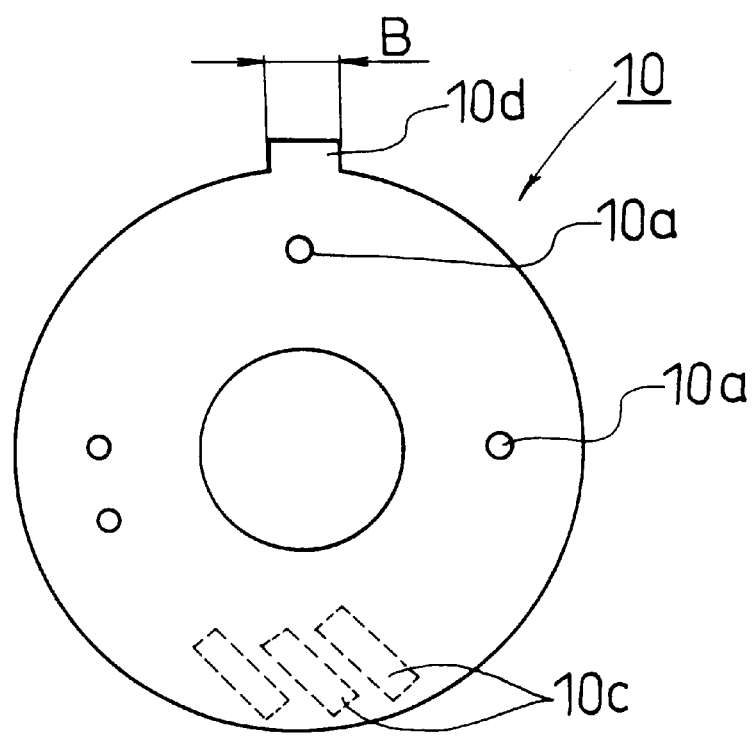
FIG. 2 is a plan view of the PC board on which no part is assembled.
Figure 3:
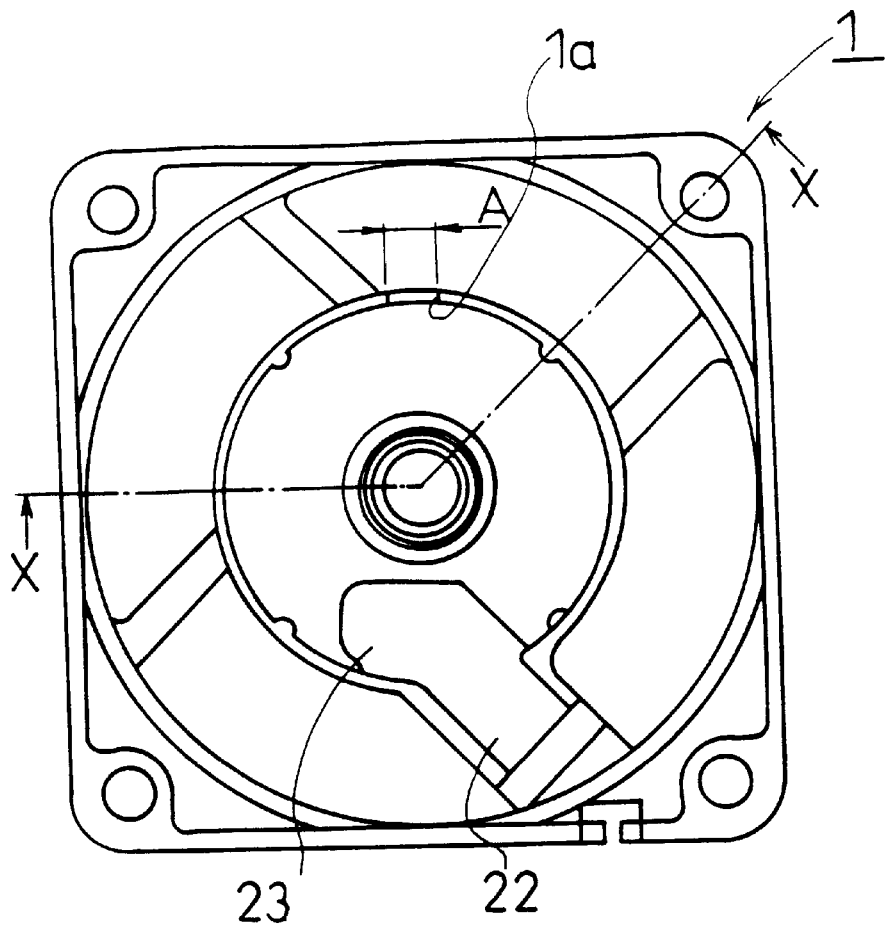
FIG. 3 is a plan view of the casing of the present invention.
Figure 4:
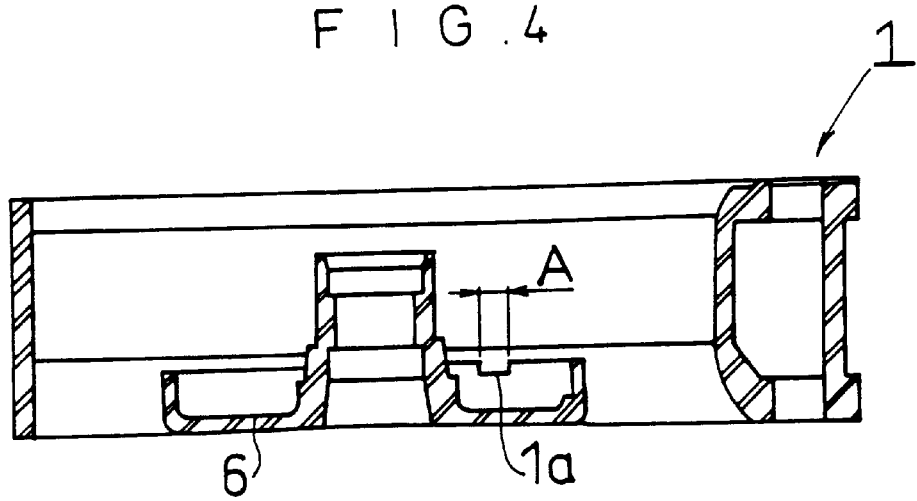
FIG. 4 is a sectional view along X—X line of FIG. 3.
Figure 5:
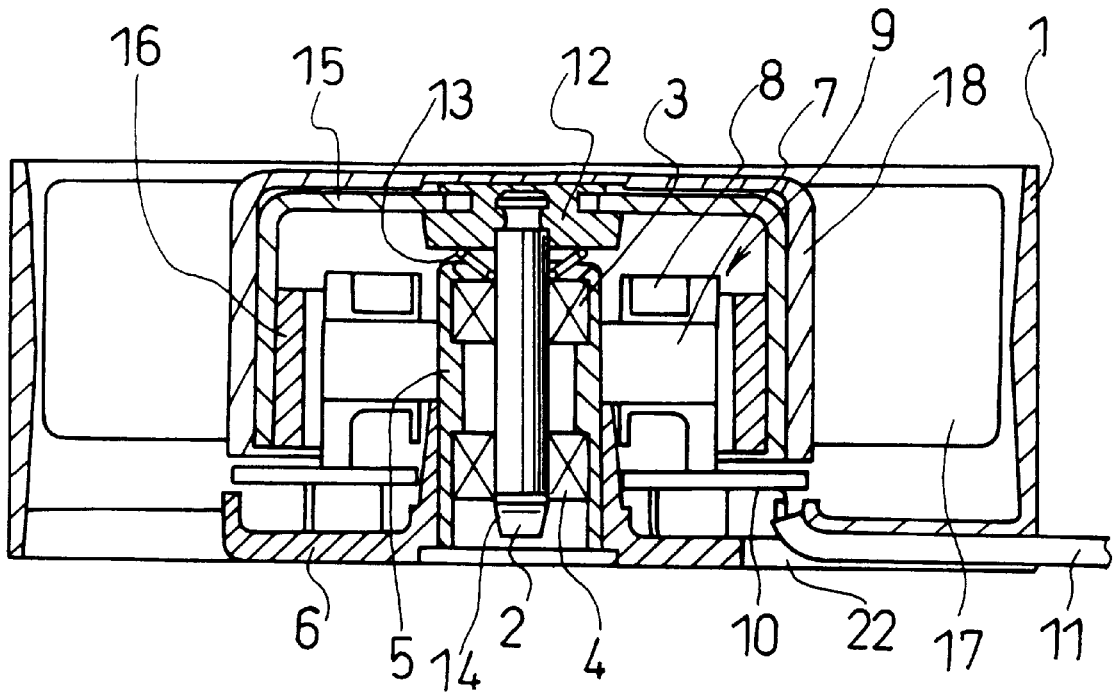
FIG. 5 is a vertically sectional view of an axial flow fan motor in conventional manner.
Figure 6:
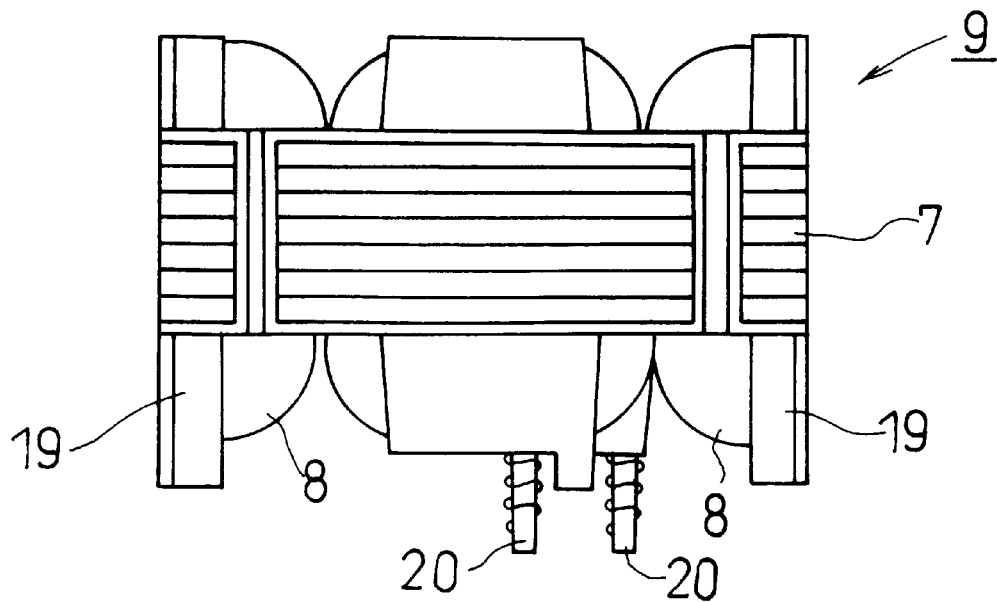
FIG. 6 is a side view of a stator.
Figure 7:
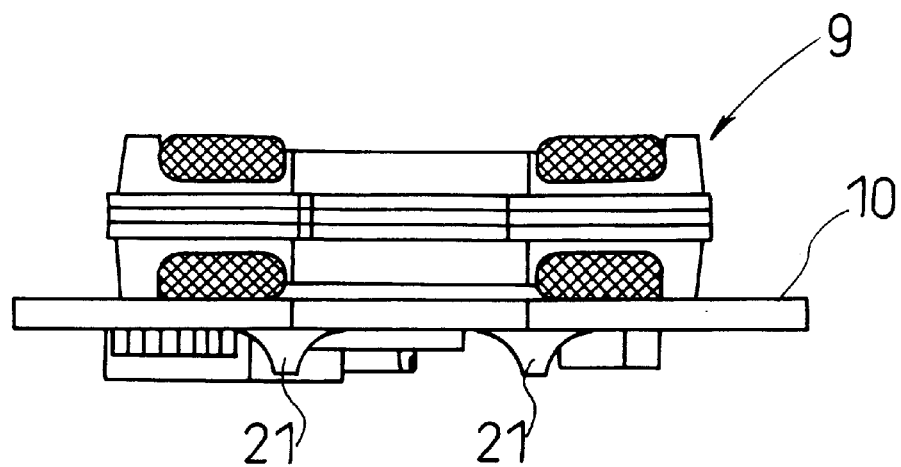
FIG. 7 is a side view showing the state where the stator is mounted on a PC board.
Figure 8:
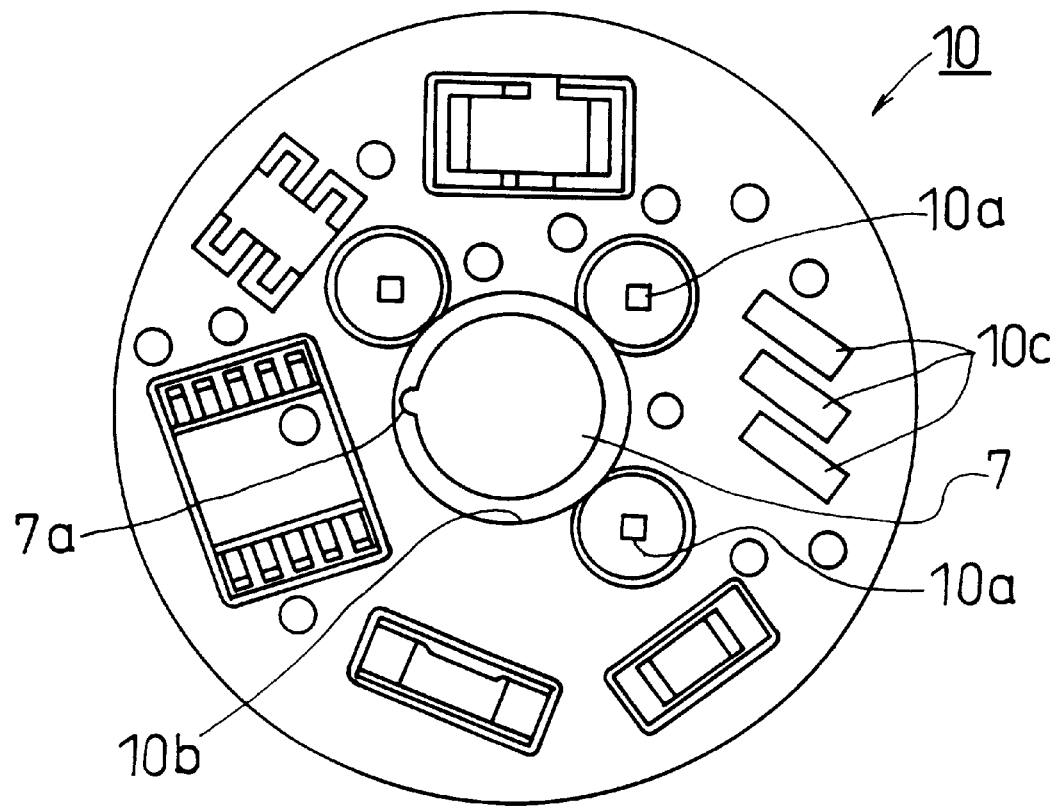
FIG. 8 is a plan view of the PC board.

Hereinafter, an embodiment of the present invention is explained. The axial flow fan motor of the present invention is identical, in its vertically sectional view, with what is shown in FIG. 5. The difference of the present invention resides in that, as shown in FIG. 2, on one portion of the outer circumference of the PC board a projection 10d having B dimension in width is provided, which is adapted to engage with a U-letter like groove 1a (FIGS. 3 and 4) provided on a cup-like edge of one portion of the motor housing 1. For reference, in FIG. 3, 22 designates a cut out portion for inserting a probe of an automatic test machine and 23 is an inlet for cord 11 to connect the PC board to an outer power source.

By thus being engaged, the PC board 10 is positioned. In order to engage the projection 10d with the groove 1a, although it is necessary to make the width of the groove 1a wider than the width of the projection 10d a little bit, on the other hand, if it is wider too much, the effect of positioning will be lost. In most cases of PC board 10, the difference of width between the groove 1a and the width of the projection 10d which engages with the groove 1a is confirmed better to be less than 0.6 mm preferably less than 0.4 mm.

When completing the assembly of the axial flow fan motor, a probe of the automatic test machine is inserted through the cut out portion 22 of the motor housing 1 and the tip end of the probe is made to contact the terminal pin 20 for testing the function of the motor from outside. As explained above, since the PC board is determined in its position, the tip end of the probe is secured to get in touch with the terminal pin 20. After checking that the motor is good in its function, a label is adhered on the cut out portion 22 to cover it.

Thus, according to the first aspect of the present invention, since the PC board is mounted in such a manner as it is correctly positioned at a given position, the tip end of the probe is secured to get in touch with the terminal pin. Accordingly, there is no need of arranging it for checking the function or no case where checking is impossible, which causes to increase the production efficiency. Further, according to the second aspect of the present invention, since the allowance of the displacement of the PC board is provided, the productions which are stably secured to be checked are obtained.

What is claimed is:

1. An axial flow motor, comprising:

a motor housing that supports a bearing box, the motor housing having a cutout portion for probing;

bearings supported by the bearing box;

a rotary shaft rotatably supported by the bearings;

a yoke fixed on the rotary shaft;

an impeller having wings, the impeller being fixed on an outer diameter portion of the yoke;

a magnet mounted on an inner diameter of the yoke;

a stator winding positioned to face the magnet; and a printed circuit board located between the stator winding and the motor housing, the printed circuit board including electronic circuits for supplying a current to the stator winding to rotate the rotary shaft, a terminal pin, and a projection provided on an outer circumference of the printed circuit board, wherein a U-letter shaped groove is provided on a portion of the motor housing with which the projection is engaged, the groove and projection providing secure positioning of the printed circuit board such that a probe of a testing device is able to be inserted through the cutout portion into contact with the terminal pin.

2. The axial flow motor of claim 1, wherein a width difference between the groove and the projection of the printed circuit board is less than 0.6 mm.

* * * * *